United States Patent
McEntire et al.

(10) Patent No.: US 9,894,909 B1
(45) Date of Patent: Feb. 20, 2018

(54) PROCESS FOR PROCESSING FRESH PRODUCE

(71) Applicant: McEntire Produce, Inc., Columbia, SC (US)

(72) Inventors: Carter McEntire, Columbia, SC (US); R. C. McEntire, Jr., Columbia, SC (US); Tom Lovelace, Columbia, SC (US); David Morris, Columbia, SC (US)

(73) Assignee: McEntire Produce, Inc., Columbia, SC (US)

(*) Notice: Subject to any disclaimer, the term of this patent is extended or adjusted under 35 U.S.C. 154(b) by 0 days.

(21) Appl. No.: 15/142,487

(22) Filed: Apr. 29, 2016

Related U.S. Application Data

(62) Division of application No. 14/456,516, filed on Aug. 11, 2014, now Pat. No. 9,326,543.

(Continued)

(51) Int. Cl.
*A23B 7/157* (2006.01)
*A23B 7/158* (2006.01)
(Continued)

(52) U.S. Cl.
CPC .............. *A23B 7/157* (2013.01); *A23B 7/158* (2013.01); *A23L 1/0011* (2013.01); *A23N 12/06* (2013.01);
(Continued)

(58) Field of Classification Search
CPC ........ A23B 7/158; A23N 12/06; B65G 15/22; B65G 15/24; B65G 2201/0211
(Continued)

(56) References Cited

U.S. PATENT DOCUMENTS

| 1,206,574 A | 11/1916 | Miller |
| 3,987,208 A | 10/1976 | Rahman et al. |

(Continued)

FOREIGN PATENT DOCUMENTS

| EP | 2452565 | 2/2011 |
| WO | 98/06273 | 2/1998 |
| WO | 2014/042848 | 3/2014 |

OTHER PUBLICATIONS

Sapers et al. "The Produce Contamination Problem: Causes and Solutions", 2009, , p. 395, Academic Press, 30 corporate Drive, Burlington, MA 01803.*

(Continued)

*Primary Examiner* — Helen F Heggestad
(74) *Attorney, Agent, or Firm* — Nexsen Pruet, LLC; Michael A. Mann

(57) ABSTRACT

Thorough spraying and draining freshly cut produce and the equipment processing it in a one-pass system that uses a dilute solution of chilled ultrapure water and chlorine dioxide or chlorine or both significantly reduces bacterial counts. Raw produce is sprayed as it is conveyed to cutting heads and as the cut pieces fall into a hopper above a conveyor. The conveyed cut produce is vibrated and tumbled while being sprayed from above. At the end of the process, the cut produce is sprayed with potable water and deposited in a dryer basket. Drainage from the equipment is collected and processed through a multi-stage water filtration system to potable quality. The near freezing water temperature, its ultra-purity, and the concentrations of biocides in the sanitizing spray are carefully established, monitored and maintained by a process controller.

6 Claims, 2 Drawing Sheets

Related U.S. Application Data

(60) Provisional application No. 61/870,524, filed on Aug. 27, 2013.

(51) Int. Cl.

| | | |
|---|---|---|
| *A23L 1/00* | (2006.01) | |
| *A23N 12/06* | (2006.01) | |
| *B65G 27/34* | (2006.01) | |
| *B65G 15/24* | (2006.01) | |
| *B65G 45/22* | (2006.01) | |
| *B65G 11/02* | (2006.01) | |
| *B26D 7/08* | (2006.01) | |

(52) U.S. Cl.
CPC ............ *B26D 7/088* (2013.01); *B65G 11/023* (2013.01); *B65G 15/24* (2013.01); *B65G 27/34* (2013.01); *B65G 45/22* (2013.01); *B26D 2210/02* (2013.01); *B65G 2201/0211* (2013.01); *B65G 2207/26* (2013.01)

(58) Field of Classification Search
USPC ........................................ 426/615, 321, 335
See application file for complete search history.

(56) References Cited

U.S. PATENT DOCUMENTS

| | | | |
|---|---|---|---|
| 4,001,443 A | 1/1977 | Dave | |
| 4,168,597 A | 9/1979 | Cayton | |
| 4,962,777 A | 10/1990 | Bell | |
| 4,988,523 A | 1/1991 | Gardner et al. | |
| 5,097,755 A | 3/1992 | Hill | |
| 5,226,972 A * | 7/1993 | Bell | A23B 7/0416 134/25.1 |
| 5,243,886 A | 9/1993 | Rudy et al. | |
| 5,316,778 A | 5/1994 | Houghman | |
| 5,775,348 A | 7/1998 | Rush et al. | |
| 5,888,570 A | 3/1999 | Arrington et al. | |
| 5,924,217 A * | 7/1999 | Peeters | F26B 17/045 34/236 |
| 7,048,956 B2 | 5/2006 | Beelman et al. | |
| 7,258,882 B2 | 8/2007 | Hankinson et al. | |
| 7,559,275 B1 | 7/2009 | Patil et al. | |
| 7,601,376 B2 | 10/2009 | Stanley | |
| 2004/0131734 A1 | 7/2004 | Petcavich | |
| 2005/0233039 A1 | 10/2005 | Wolfe et al. | |
| 2008/0032010 A1 | 2/2008 | Hankinson et al. | |
| 2008/0085346 A1 | 4/2008 | Kravitz et al. | |
| 2009/0238934 A1 | 9/2009 | Lingham et al. | |
| 2011/0247655 A1 | 10/2011 | Lewis et al. | |

OTHER PUBLICATIONS

Washington State University; Postharvest Information Network; from http://postharvest.tfrec/wsu.edu/pages/J4I1B; Jul. 27, 2016.

* cited by examiner

PROCESS FOR PROCESSING FRESH PRODUCE

TECHNOLOGICAL FIELD

The technological field of the present disclosure relates to the field of processing fresh produce. In particular, the technological field relates to sanitary slicing and dicing fresh produce prior to packaging.

SUMMARY OF THE INVENTION

The present invention is a system for processing fresh produce, and in particular, processing it by cutting it into pieces prior to packaging for eventual purchase by consumers. The present processing reduces bacteria on the raw produce by several orders of magnitude using a biocide wash on both the produce and the processing equipment. Conveyors convey the produce, first to cutting heads in an industrial cutter, and then from the cutter to a series of washing screens. While being conveyed to the industrial cutting heads, the produce is washed by spray heads to rid it of organic material and to make it more sanitary. The sanitizing solution is directed from sprayer heads not only on the produce before and after cutting, but also at the conveyors, the hopper, and the cutting heads. The sanitizing spray is not reused; it is used only once, then collected and filtered to a purified water state. The temperature, water purity, and concentration of the particular biocide used, namely, chlorine dioxide, chlorine (sodium hypochlorite) or a combination of both, in the sanitizing spray are carefully established, monitored and maintained. When using chlorine (sodium hypochlorite), an acid buffer must also be used to control PH when higher strengths of chlorine are necessary.

The uncut produce is dumped from a bin onto a first conveyor that conveys it to the in-feed of a cutter where it is fed into and through a set of cutting heads that cut it into pieces. The cut produce then falls from the cutter into a hopper at the start of an incline wash conveyor. The cutting heads of the industrial cutter are exposed to the sanitizing spray to clean both the produce and the cutting heads inside the blade housing. In addition, the pieces of cut produce are also sprayed as they fall from the cutter into the hopper below. The surface of the incline wash conveyor is also sprayed and is perforated to allow the received spray to drain quickly. Sprayer heads direct the spray at the top surface of the first conveyor and at the top and bottom of the incline wash conveyor. These sprays remove exudate, foreign material and fine cuttings from the product.

The produce proceeds to a decline conveyor having one conveyance with six tiers; each successive tier is positioned slightly below the previous tier so that the produce tumbles as it moves from one tier to the next, thereby presenting its different sides to the sanitizing spray and draining more efficiently.

The water for the sanitizing spray comes from a tank storing ultrapure water, the output from a water purification system that uses an ultrafiltration system to remove organisms and contaminants. A multi-stage filtration system filters particles and macromolecules from water to produce potable water, and is capable of removing 90%-100% of total plate count and coliform. The water tank is connected to a chiller tank that is connected to a first and second biocide tank containing chlorine dioxide ($ClO_2$) and Chlorine ($Cl_2$), respectively. A controller directs a small amount of $ClO_2$ or $Cl_2$, or both, from these tanks into the chiller tank where it is mixed with ultrapure water from the water tank and chilled. The two mix to form a sanitizing solution with a concentration of 0.01 to 2.99 parts per million (ppm) $ClO_2$ and/or 0.01 to 200 parts per million (ppm) $Cl_2$. From the chiller, the controller causes the mixture to be pumped through a manifold to individual sprayer heads for use on the produce and equipment processing it.

Other features and their advantages will be apparent to those skilled in the art of processing fresh produce from a careful reading of the Detailed Description of Embodiments accompanied by the following Drawings.

DETAILED DESCRIPTION OF EMBODIMENTS

The present produce washing system and process is comprehensive and thorough, and provides significant improvements over open and closed flume wash systems in removing organic load, exudate, insects and foreign material and reducing the initial bacterial count on the raw produce by several orders of magnitude. The present process and system capabilities allow for thorough cleaning of fresh produce in a controlled interior environment thereby reducing a broader spectrum of bacteria by an order of magnitude equal to or greater than conventional fresh produce wash flume systems all the while using a relatively lower volume of water and less total chlorine and chlorine dioxide. This outcome results from the thoroughness of the spraying of both the produce and the equipment with a chilled sanitizing solution and use of a potable water spray finish. And, as important as the thorough spraying with chlorinated and chlorine dioxide water is, the inherent avoidance of re-exposure of the produce to an accumulation of a broader spectrum of bacteria from reused water and the buildup over time of a broader spectrum of bacteria on unclean equipment that is in the conventional wash flume system is even more significant. It is insufficient to remove the bacteria from one batch of produce only to allow that produce to come into contact with same bacteria as was removed from the previous batches via reused water and unclean equipment. The present wash system removes wash water and equipment in contact with the wash water as a source of cross contamination.

The present system and process cleans and sanitizes both the produce and the equipment using a sanitizing solution of ultrapure water, chlorine dioxide and/or chlorine. The equipment is cleaned during use by the sanitizing solution in a one-pass system. Specifically, after the sanitizing solution is applied to the produce and equipment, it is immediately drained, collected and processed to return it to potable water levels; the sanitizing solution is not used more than once. Cross-contamination opportunities throughout the entire line process are therefore significantly reduced as a result of the combination of using ultrapure water, chilling the water to retard bacterial growth, using an effective biocide or combination of biocides, applying the biocide not only to the produce but to the equipment it comes into contact with, and using the sanitizing solution only once.

Figure 1:
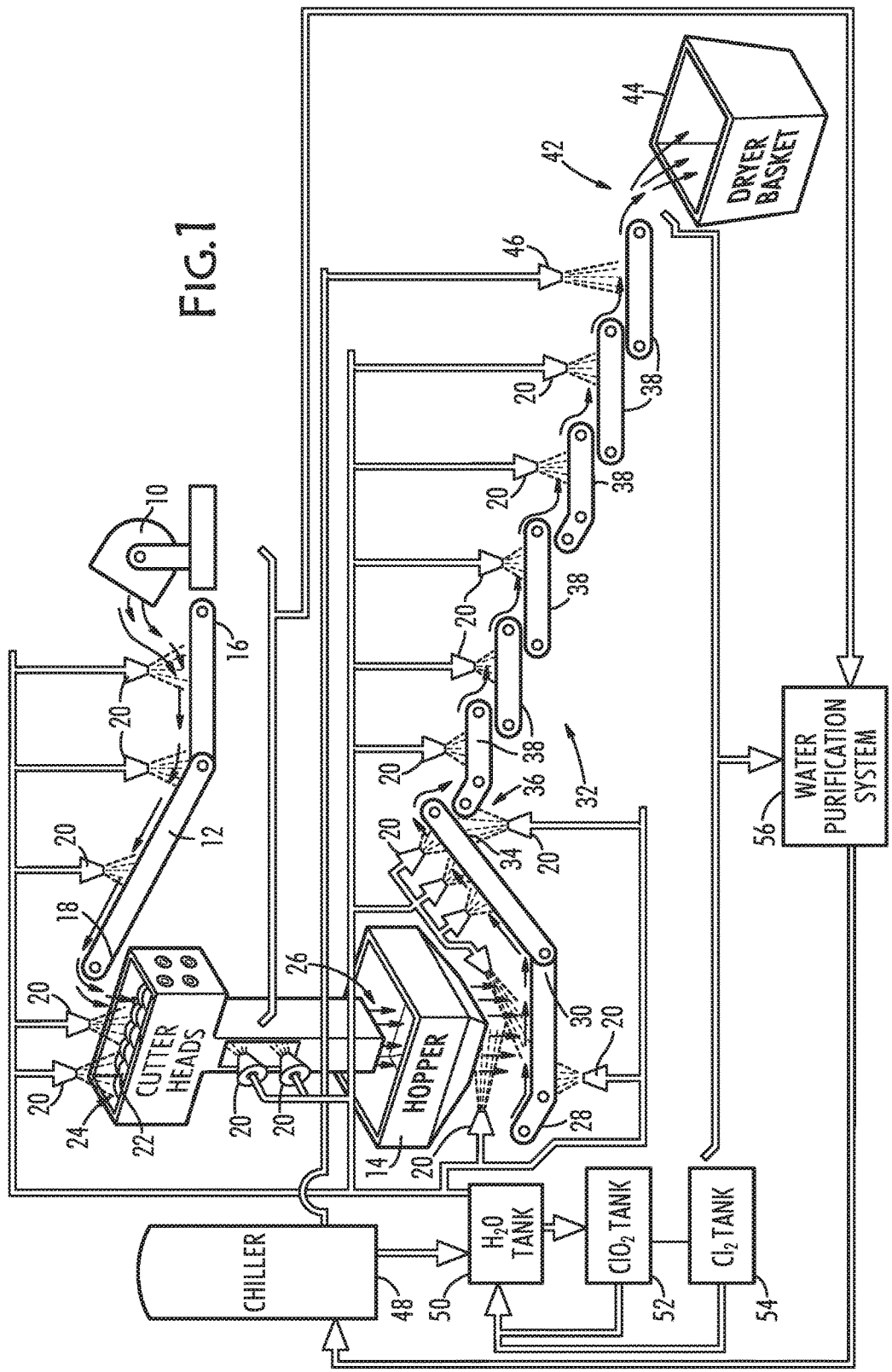
FIG. 1 is diagram of the system and method for processing produce.

Referring now to FIG. 1, the present process begins by transferring the produce from a bin 10 onto a first conveyor 12 that moves it to cutting heads 22. The produce is put into bin 10 which may be rotated to transfer the produce onto a first end 16 of first conveyor 12. First conveyor 12 transfers the produce to a second, opposing end 18 of first conveyor 12 proximate to cutting heads 22 of an industrial cutter. As the produce is being transferred, it is sprayed by sprayer heads 20 with a sanitizing solution to remove organic material, including foreign material and insects. The speed of first conveyor 12 and the flow rate of sanitizing solution spray are selected for the particular type of produce and its source in order to provide sufficient time to wash both the produce and the surface of first conveyor 12 on which it travels. Cutting heads 22 have an inlet 24 and an opposing outlet 26. Between inlet 24 and outlet 26, cutting heads 22 cut the produce into suitably-sized pieces ranging from coarsely chopped lettuce to diced onions. The pieces of produce fall from outlet 26 and into a hopper 14 above a first end 28 of a second conveyor 30, which may be an incline conveyor, to its second end 34. Meanwhile sanitizing solution is sprayed onto the produce as it falls into hopper 14 from cutting heads 22. Both organic materials washed from the produce and the sanitizing solution itself are immediately drained through the perforated surface of second conveyor 30. The term perforated means the support surface of the conveyor has a multiplicity of holes, such a screen, grid, or metal sheet with an array of holes.

Second conveyor 30 transfers produce from its first end 28 to an opposing second end 34 where produce is transferred to a first end 36 of a third conveyor 32 which may be a decline conveyor. Third conveyor 32 moves product down a set of tiers 38 while spraying heads 20 direct sanitizing solution at the produce pieces from above and the perforated surface of third conveyor 32. Each tier 38 of third conveyor 32 is slightly lower than the level of the preceding tier 38 so that the produce tumbles from tier to tier to thereby expose different sides of the produce pieces to the spray from sprayer heads 20. Each tier 38 may also vibrate to encourage drainage and the spread of the produce pieces laterally for improved cleaning and sanitizing. Tumbling and vibrating the produce pieces assures that all sides of each of the pieces of produce are presented to the sprayer heads 20 for thorough washing. At second end 42 of third conveyor 32, the produce is transferred to a dryer basket 44 where continued draining of moisture occurs. As the cut produce travels over tiers 38 of third conveyor 32, it is sprayed from above by sprayer heads 20 for thorough washing. At second end 42 of third conveyor 32, the cut produce is sprayed with potable water from a sprayer 46, rather than sanitizing solution, before it falls into dryer basket 44. Total dwell time on second and third conveyors 30, 32, may be a minimum of fifty seconds but is adjustable as needed.

The supply of sanitizing solution comes from a Chiller 48 for chilling to less than 5 degrees C. (40 degrees F.), as needed. It is directed from there to a water tank 50 for storage. Water tank 50 receives biocide from either a first biocide tank 52 containing $ClO_2$ and from a second biocide tank 54 containing $Cl_2$, or from both, to mix with the chilled water to produce the concentrations needed for effective reduction of pathogens. As the level of water tank 50 falls, it is refilled from water purification system 56, which is the collected drainage from conveyors 12, 30, 32, from cutting heads 22, and from dryer basket 44 that has been subsequently processed. This water is purified by a multi-stage filtration system to purified level before pumping to water chiller 48 and subsequently, to water tank 50. Water purification removes macromolecules, pathogens and particulate to between 90%-100%. Well water or municipal city water may also be used in combination with purified water to supply water chiller 48 and subsequently, water tank 50 for the simply clean process.

Chlorine dioxide is a preferred biocide, but, by adding a free chlorine probe, the system is then capable of using Chlorine ($Cl_2$), otherwise known as sodium hypochlorite, in the place of or in addition to $ClO_2$ at strengths ranging from 1 ppm free chlorine to 200 ppm of free chlorine with the use of buffers or other chemicals to achieve higher $ClO_2$ strength.

Each tier 38 of third conveyor has a perforated surface with holes sized for removal of fines, insects, foreign material or "off size" (i.e., small) pieces by the pressurized water sprayer heads 20. These surfaces may be removed for sterilization as well as to substitute perforation patterns and sizes (both the surfaces and sprayer heads are designed to simplify change out) as various types of produce may be cut in different ways and into different sizes.

Each tier 38 may have four spray bars consisting of six spray heads per bar for thorough dispersion of sanitizing solution. Typically two spray bars per tier may be in use with typical produce. The other two spray bars per tier can be activated when the organic load is heavier. Sprayer heads 20 may be confined under a removable stainless steel hood to limit the extent to which sanitizing solution is dispersed, an important consideration since the biocide is a chlorine-based compound. The water pressure may also be adjustable to allow the force and volume of sanitizing solution to be tuned to the particular produce type and source.

The sanitizing solution sprayer heads 20 that are directed at cutting heads 22 are high-volume, one-pass, pressurized wash sprays designed to wash off the heaviest load of organic material, or exudate, and thereby significantly reduce bacterial count. These pressurized sprayer heads 20 are fed from water tank 50, described in more detail below. Sprays from sprayer heads 20 also help to reduce product bruising as they slow the produce as it leaves outlet 26 and enters hopper 14.

Figure 2:
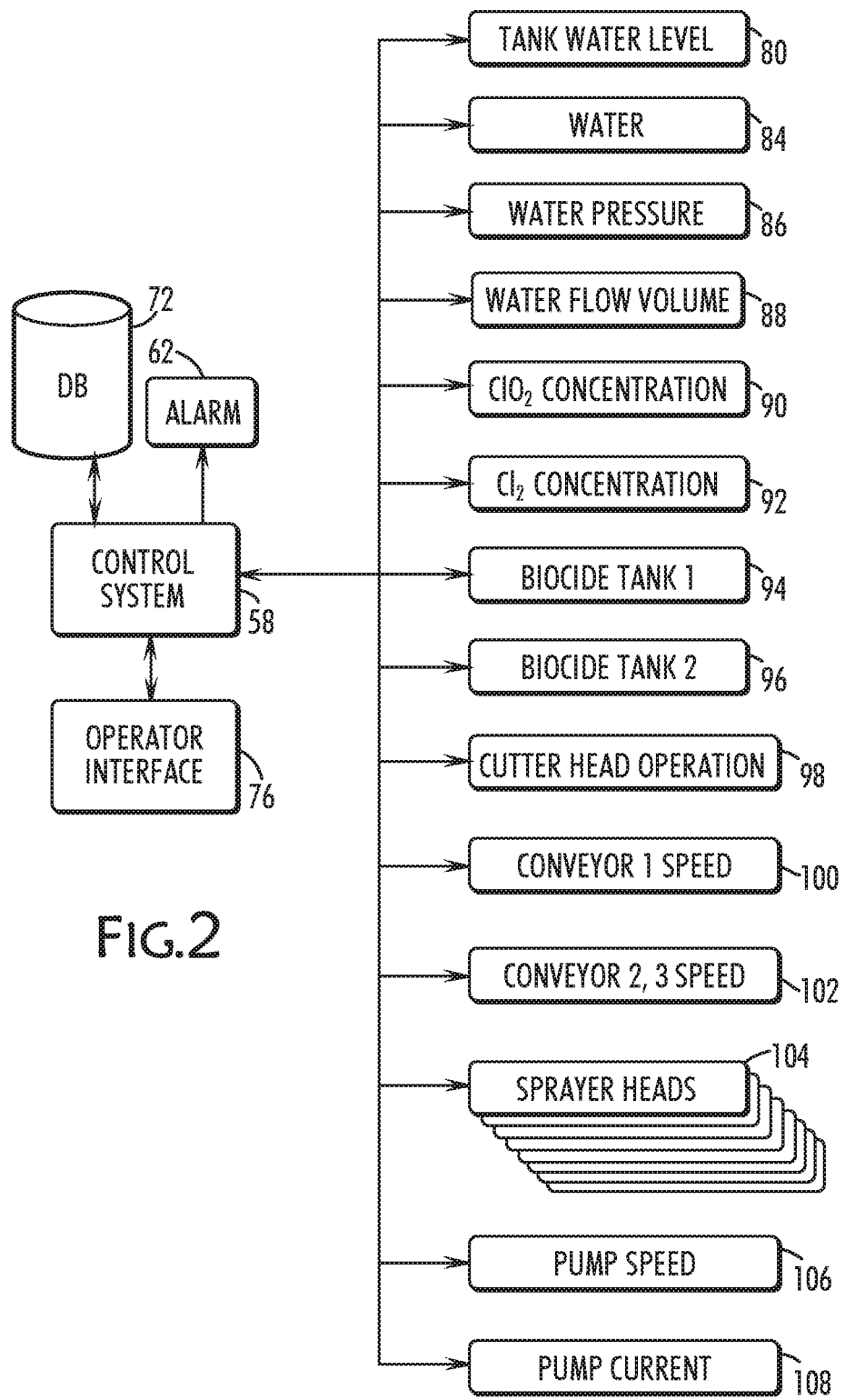
FIG. 2 is a schematic diagram of the controls for the present system and method for processing produce.

The present system and process is controlled by a control system 58, which is operated via an operator interface 76, as best seen in FIG. 2. Control system 58 is connected to valves and sensors to manage the operation in accordance with programmed protocols, limits, and settings. Control system monitors and controls the water tank level 80, water temperature 84, water pressure 86, water flow volume 88, $ClO_2$ concentration 90 in the sanitizing solution, free $Cl_2$ concentration 92 in the sanitizer solution, a first biocide tank level 94 (for $ClO_2$), a second biocide tank level 96 (for free $Cl_2$), cutter head operation 98, first conveyor speed 100, second and third conveyor speed 102, sprayer head operation 104, pump speed 106, and pump electrical current 108. This information is displayed by operator interface 76 and stored in a database 72.

The speeds of conveyors 12, 30, 32, are adjustable by control system 58 to accommodate the particular type of produce being processed. Speed control is critical to ensure the flow of raw product does not exceed the sanitizing and washing capability of the system but still provide good through-put. Similarly, because the concentration of $ClO_2$ and $Cl_2$ are critical to pathogen reduction, the sanitizing solution concentrations of these biocides are periodically measured using meters before and after it has come into contact with the produce to verify the concentration has not fallen below a minimum of 1.0 ppm $ClO_2$ and but remains near the nominal 1.25 ppm level. $Cl_2$ concentrations may range from 0.1 to 200 PPM but are held close to 15 PPM. Concentration measurements provided to control system 58 enable it to determine when the concentration of $ClO_2$ in the sanitizing solution needs to be increased.

This system uses water processed through a water purification system 56, and may also use well water or municipal city water, and is chilled in chiller 48, such as an ammonia plate chiller to reduce its temperature to between 1 and 5 degrees Celsius (33 and 40 degrees Fahrenheit), and stored in water tank 50, The use of very pure, very cold water enables the present system and process to begin with a clean source of water rather than one carrying bacteria from previous uses, and also one that slows the growth of bacteria carried on the produce because of its low water temperature.

The water is mixed with a small amount of $ClO_2$ from 1st biocide tank 52 or of $Cl_2$ from biocide tank 54 or both and a buffer from water tank 50 to form a sanitizing solution. The $ClO_2$ and/or $Cl_2$ and buffer concentrations in the sanitizing solution are established, monitored, and controlled by control system 58, which detects the concentration of $ClO_2$ and free $Cl_2$ and injects additional $ClO_2$ or free $Cl_2$ as needed to maintain average concentrations of 1.25 PPM of $ClO_2$ and of 15 PPM of free chlorine; additionally, PH is monitored and controlled to a target of 5.0 with a range of 4 to 6.5 in the sanitizing solution. If control system 58 senses a concentration outside of the pre-selected range, it issues an alarm 62 and halts production. Production may not be restarted and the sanitizing solution may not resume flowing until the correct range is reached.

Each produce line is independent of other produce lines and has its own water chilling system with its own sanitizing solution concentration range specific for the particular raw commodity to be processed. This product separation also helps to reduce cross contamination.

$ClO_2$ has numerous advantages over chlorine. Unlike chlorine, which has a biocidic activity that declines as the pH of the solution increases or decreases, the biocidic activity of $ClO_2$ is consistent over a broad pH range. Furthermore, the effectiveness of chlorine as a biocide at low concentrations is more limited than that of $ClO_2$. In fact, $ClO_2$ can achieve a 5 log reduction in pathogens at low dosages in less than 60 seconds and has been shown to be more effective in limiting regrowth of bacteria than chlorine. Additionally, the concentration of chlorine is much harder to maintain in water with large concentrations of organic materials. And perhaps most importantly, chlorine reacts with organic materials with a chlorinating reaction that results in carcinogenic by-products, but $ClO_2$, on the other hand, operates based on an oxidizing reaction that inhibits production of carcinogenic by-products At each step in the process, sprayer heads 20 are directed either at the produce or at the equipment or both. Water alone may remove organic matter, exudate, foreign materials and insects, but, in addition, the bacterial count must be reduced by several orders of magnitude. The use of ultrapure water avoids adding pathogens to those that are present on the produce. The sanitizing solution is used in a one-pass mode, which means that, once applied, the sanitizing solution is drained from the produce, collected and, processed to yield potable water, but is not reused before it is purified. Implicitly, not re-using sanitizing solution means that there are no pipes that lead directly back to the water storage tank 50 or water chiller 48 from the collected fluids in the present process. Also, because sanitizing solution is not reused, there is no organic load requiring treatment with buffers, anti-foam agents or other chemical additives. Additionally, the total volume of sanitizing solution used and total sanitizing solution required to be brought into contact with the produce in order to attain the solution strength are both greatly reduced.

Applying sanitizing solution to the equipment prevents accumulation of bacteria from each batch of produce. Care is taken to spray the produce thoroughly, such as spraying produce from above on conveyor 12, spraying the pieces of produce falling from cutter heads 22 and spraying pieces of cut produce as it moves down conveyors 30, 32, and tumbling the produce as it passes from one tier 38 of conveyor 32, to the next tier 38 so that all sides of the produce present themselves to the sprayer heads 20. The presence of a modest concentration of $ClO_2$ and/or $Cl_2$ in the sanitizing solution effectively reduces the bacteria and other pathogens. Keeping the sanitizing solution cold helps to prevent re-growth of the bacteria. Separating product lines also helps to prevent cross contamination and allows for variations in the biocide concentration for the peculiarities of different types of produce. The result of these steps taken in the present process is a reliable, repeatable, multiple-order-of-magnitude reduction in bacterial count from fresh, raw produce to processed produce ready for consumption.

Control system 58 stores produce feed rates and sanitizing solution concentration ranges in a database 72 for each commodity and type of cut. These data inform general settings which may be modified when unusual conditions exist on the raw product to achieve consistent product quality. Icons and product codes simplify use of control system 58 when an operator is programming it for each type of produce. If the system fails to maintain the specified sanitizing solution concentration range, the control system will automatically shut down conveyors 12, 30, 32, and cannot be restarted until the sanitizing solution concentration is restored to a value within the specified range. Furthermore, production personnel are precluded from controlling this system; management oversight is required for restart.

In the foregoing description of embodiments of the invention and accompanying drawings, particular aspects are deemed especially important for eliminating or at least significantly reducing cross contamination risks compared to prior art systems for processing fresh produce. These include spraying the produce, conveyors, cutter heads, and other equipment while the produce is being processed including the underside of the conveyors; using free chorine and chloride dioxide as a bactericide; spraying the produce as it falls from the cutting heads and while shaking and tumbling it after cutting; and use of pure, chilled water; and not recycling process water. Within these, various adjustments can be made to improve outcomes when different types of produce from different sources is being processed, namely, adjusting the throughput of produce, adjusting the number of sprayers and the sprayed volumes, adjusting the speed of the conveyors, lengthening or shortening the conveyors, changing the size of the perforations on the screens, and adjusting the concentration of bactericide in the water. A modest amount of experimentation will enable those skilled in the art of processing fresh produce to locally optimize the present process as described herein for their specific circumstances.

Those skilled in the art of processing fresh produce will appreciate that many substitutions and modification may be made to the embodiments described above without departing from the spirit and scope of the present invention, as defined by the appended claims.

What is claimed is:

1. A method for processing produce, said method for use with a source of water, said method comprising the steps of:
    (a) conveying produce on a first conveyor having a first end and an opposing second end;
    (b) depositing said produce into a cutter having cutting blades, an inlet and an opposing outlet, said inlet of said cutter being proximate to said second end of said first conveyor so that said inlet receives said produce from said first conveyor;

(c) exposing said produce to said cutting blades in said cutter whereby said produce is cut into pieces;
(d) depositing said pieces of produce into a hopper spaced apart from said cutting blades and directly above a second conveyor having a first end and a second end, said first end of said second conveyor being proximate to said outlet of said hopper so that said pieces of produce fall onto said first end of said second conveyor;
(e) depositing said produce onto a first end of a third conveyor from said second end of said second conveyor, said third conveyor having a series of tiers, each tier of said third conveyor being at a higher elevation than a subsequent tier of said third conveyor so that said produce tumbles when moving from said each tier to said subsequent tier;
(f) vibrating said third conveyor so that said produce spreads on said tiers; and
(e) spraying a mixture of purified water and $ClO_2$ or $Cl_2$, and combinations thereof, on said produce, including produce falling from said cutter to said hopper and moving on said first, said second and said third conveyors, and on said on said first, said second, and said third conveyors from above and below, on said cutter blades, and on said hopper when said first, said second, and said third conveyors are moving.

2. The process as recited in claim 1, further comprising the step of chilling said purified water to a temperature between 1 degree and 5 degrees C.

3. The process as recited in claim 1, wherein said mixture of $ClO_2$ and purified water is at least 1.00 ppm $ClO_2$ and less than 3.00 PPM $ClO_2$.

4. The process as recited in claim 1 wherein said mixture is controlled to 1.25 PPM $ClO_2$.

5. The process as recited in claim 1, wherein said method further comprises the steps of:
(a) draining said mixture from said first and second and third conveyor, said hopper, and said cutting blades;
(b) then collecting said mixture; and
(c) then discharging said mixture.

6. The process as recited in claim 1, further comprising the step of spraying said pieces of produce with potable water at said second end of said third conveyor.

* * * * *